United States Patent
Kirby (10) Patent No.: US 7,624,531 B2
(45) Date of Patent: Dec. 1, 2009

(54) FISH ALARM SYSTEM

(76) Inventor: Brian Stanley Kirby, 3329 Country Hill Rd., Antioch, TN (US) 37013

( * ) Notice: Subject to any disclaimer, the term of this patent is extended or adjusted under 35 U.S.C. 154(b) by 170 days.

(21) Appl. No.: 11/776,612

(22) Filed: Jul. 31, 2007

(65) Prior Publication Data

US 2009/0031609 A1    Feb. 5, 2009

(51) Int. Cl.
*A01K 97/12* (2006.01)
(52) U.S. Cl. .......................... 43/17; 43/17.5
(58) Field of Classification Search ............. 43/17, 43/16, 17.5
See application file for complete search history.

(56) References Cited

U.S. PATENT DOCUMENTS

| | | | | |
|---|---|---|---|---|
| 2,556,628 A | * | 6/1951 | Nisle, Sr. | 43/17 |
| 2,574,333 A | * | 11/1951 | Kuczynski et al. | 43/17 |
| 2,791,858 A | * | 5/1957 | Kernodle | 43/25 |
| 2,869,275 A | * | 1/1959 | Levin | 43/17 |
| 2,978,828 A | * | 4/1961 | Taylor et al. | 43/17 |
| 3,134,187 A | * | 5/1964 | Blakely | 43/17 |
| 3,470,647 A | * | 10/1969 | Horner | 43/17 |
| 3,600,836 A | * | 8/1971 | Miyamae | 43/17 |
| 3,670,443 A | * | 6/1972 | Federline | 43/17 |
| 3,702,513 A | * | 11/1972 | Watts | 43/17 |
| 3,711,847 A | * | 1/1973 | Barrows | 43/17 |
| 3,739,514 A | * | 6/1973 | Odney | 43/17 |
| 3,835,462 A | * | 9/1974 | Periman | 43/17 |
| 3,878,635 A | * | 4/1975 | Trosper et al. | 43/17 |
| 3,913,255 A | * | 10/1975 | Fillmen | 43/17 |
| 3,959,910 A | * | 6/1976 | Montgomery | 43/17 |
| 3,999,323 A | * | 12/1976 | Vitucci | 43/17 |
| 4,020,578 A | * | 5/1977 | Hope | 43/17 |
| 4,023,298 A | * | 5/1977 | Story | 43/17 |
| 4,051,616 A | * | 10/1977 | Mathauser | 43/17 |
| 4,209,930 A | * | 7/1980 | Boynton | 43/17 |
| 4,246,716 A | * | 1/1981 | Elmer | 43/17 |
| 4,266,217 A | * | 5/1981 | Kao et al. | 43/17 |
| 4,376,349 A | * | 3/1983 | Yarczower | 43/17 |
| 4,384,425 A | * | 5/1983 | Lemons, Sr. | 43/17 |
| 4,418,489 A | * | 12/1983 | Mathauser | 43/17 |
| 4,422,258 A | * | 12/1983 | Adams et al. | 43/17 |
| 4,447,979 A | * | 5/1984 | Taylor | 43/17 |

(Continued)

FOREIGN PATENT DOCUMENTS

DE    4439356 A1 *   5/1996

(Continued)

*Primary Examiner*—Darren W Ark
(74) *Attorney, Agent, or Firm*—James Addison Barry, Jr.

(57) ABSTRACT

A fish alarm system 100 comprising: an alarm toggle switch 110 in combination with a tension clip 130; an enclosure 150; an alarm 160; and power source 180; wherein the alarm toggle switch 110 may include an at least two position switch, having an alarm toggle arm 112 disposed through the enclosure 150 attached with the tension clip 130 such that a fishing line 310 may be inserted in the tension clip 130 whereby as the force on the fishing line 310 increases, the tension of the tension clip 130 may allow the alarm toggle arm 112 to move from an off position 113 to an interim or bite position 114 for activating the alarm 160, from the interim position 114 to a hook set position 115 for hook set and possible second alarm, and then release the fishing line 310 from the tension clip 130.

20 Claims, 8 Drawing Sheets

U.S. PATENT DOCUMENTS

| | | | | |
|---|---|---|---|---|
| 4,458,437 A * | 7/1984 | Ou | .................. | 43/17 |
| 4,466,211 A * | 8/1984 | Mathauser | .................. | 43/17 |
| 4,516,348 A * | 5/1985 | Hirose et al. | .................. | 43/17 |
| 4,541,195 A * | 9/1985 | Delaney | .................. | 43/17 |
| 4,616,437 A * | 10/1986 | Harvey | .................. | 43/17 |
| 4,625,446 A * | 12/1986 | Morimoto | .................. | 43/17 |
| 4,633,608 A * | 1/1987 | Savarino | .................. | 43/17 |
| 4,658,531 A * | 4/1987 | Morimoto | .................. | 43/17 |
| 4,660,316 A * | 4/1987 | Gamelin | .................. | 43/17 |
| 4,693,125 A * | 9/1987 | Krutz et al. | .................. | 43/17 |
| 4,698,933 A * | 10/1987 | Shaw | .................. | 43/43.12 |
| 4,928,419 A * | 5/1990 | Forrestal | .................. | 43/17 |
| 4,930,243 A * | 6/1990 | Lowe et al. | .................. | 43/17 |
| 4,972,622 A | 11/1990 | Fuchs | | |
| 5,010,678 A * | 4/1991 | Peck et al. | .................. | 43/17 |
| 5,050,332 A | 9/1991 | Cross | | |
| 5,088,223 A * | 2/1992 | Chu | .................. | 43/17 |
| 5,129,174 A * | 7/1992 | Wilson | .................. | 43/17 |
| 5,163,246 A * | 11/1992 | Shaw | .................. | 43/43.12 |
| 5,259,252 A * | 11/1993 | Kruse et al. | .................. | 43/17 |
| 5,261,180 A * | 11/1993 | Foster et al. | .................. | 43/17 |
| 5,321,391 A * | 6/1994 | Fox | .................. | 43/17 |
| 5,396,726 A * | 3/1995 | Zepeda, Sr. | .................. | 43/17 |
| 5,495,688 A * | 3/1996 | Sondej et al. | .................. | 43/16 |
| 5,501,027 A * | 3/1996 | Acker | .................. | 43/17 |
| 5,570,532 A * | 11/1996 | Shaffer et al. | .................. | 43/17 |
| 5,758,449 A * | 6/1998 | Munsterman et al. | .................. | 43/17 |
| 5,771,624 A * | 6/1998 | Vickery et al. | .................. | 43/17 |
| 5,867,931 A * | 2/1999 | Morris et al. | .................. | 43/17 |
| 5,898,372 A * | 4/1999 | Johnson et al. | .................. | 43/17 |
| 6,012,247 A | 1/2000 | Kinsey | | |
| 6,101,757 A * | 8/2000 | Draghici | .................. | 43/17 |
| 6,138,398 A * | 10/2000 | Livingston | .................. | 43/17 |
| 6,293,043 B1 * | 9/2001 | Zwettler | .................. | 43/17 |
| 6,341,443 B1 * | 1/2002 | Watford et al. | .................. | 43/17 |
| 6,374,533 B1 * | 4/2002 | Gonzales | .................. | 43/17 |
| 6,393,753 B1 * | 5/2002 | Walker | .................. | 43/17 |
| 6,408,561 B1 * | 6/2002 | Winter | .................. | 43/17 |
| 6,568,121 B1 * | 5/2003 | Gonzales | .................. | 43/17 |
| 6,588,137 B1 * | 7/2003 | Rozkowski | .................. | 43/17 |
| 6,591,222 B2 * | 7/2003 | Stiner | .................. | 43/20 |
| 6,634,134 B1 * | 10/2003 | Nyquist | .................. | 43/16 |
| 6,671,994 B1 * | 1/2004 | Klein | .................. | 43/17 |
| 6,708,441 B2 * | 3/2004 | Dirito | .................. | 43/17 |
| 6,763,630 B1 * | 7/2004 | Jenkins | .................. | 43/17 |
| 6,935,068 B2 * | 8/2005 | Shackelford | .................. | 43/17 |
| 6,938,367 B2 * | 9/2005 | Cameron et al. | .................. | 43/17 |
| 6,966,140 B1 * | 11/2005 | Rozkowski | .................. | 43/17 |
| 7,183,931 B1 * | 2/2007 | Russell | .................. | 43/17 |
| 7,322,253 B2 * | 1/2008 | Owens | .................. | 43/17 |
| 7,343,261 B1 * | 3/2008 | Kell | .................. | 43/17 |
| 7,395,628 B2 * | 7/2008 | Rayfield | .................. | 43/17 |
| 7,454,861 B1 * | 11/2008 | Keibler | .................. | 43/17 |
| 2002/0112392 A1 | 8/2002 | Heath | | |
| 2005/0246939 A1 | 11/2005 | Keck | | |
| 2006/0130387 A1 * | 6/2006 | Shumansky | .................. | 43/17 |
| 2006/0218843 A1 * | 10/2006 | Sanchez et al. | .................. | 43/17 |
| 2008/0066366 A1 * | 3/2008 | Todd | .................. | 43/17 |

FOREIGN PATENT DOCUMENTS

| | | | |
|---|---|---|---|
| EP | 1059029 A1 * | 12/2000 | |
| EP | 1236395 A2 * | 9/2002 | |
| GB | 2074831 A * | 11/1981 | |
| GB | 2080081 A * | 2/1982 | |
| GB | 2292057 A * | 2/1996 | |
| GB | 2294379 A * | 5/1996 | |
| GB | 2313281 A * | 11/1997 | |
| GB | 2323006 A * | 9/1998 | |
| GB | 2324696 A * | 11/1998 | |
| GB | 2324949 A * | 11/1998 | |
| GB | 2335338 A * | 9/1999 | |
| GB | 2348095 A * | 9/2000 | |
| JP | 01067144 A * | 3/1989 | |
| JP | 01124344 A * | 5/1989 | |
| JP | 06169674 A * | 6/1994 | |
| JP | 08140545 A * | 6/1996 | |
| JP | 09187202 A * | 7/1997 | |
| JP | 11127750 A * | 5/1999 | |
| JP | 2000004747 A * | 1/2000 | |
| JP | 2002315491 A * | 10/2002 | |
| JP | 2004166528 A * | 6/2004 | |
| JP | 2004201559 A * | 7/2004 | |
| WO | WO 2007068158 A1 * | 6/2007 | |

* cited by examiner

FISH ALARM SYSTEM

FIELD OF INVENTION

The present invention relates to a device that may be used by fishermen to alert the fisherman of a fish bite.

BACKGROUND OF INVENTION

There are a number of fish bite alarms or fish hook setting devices. However, alarm and hook setting functions typically require separate non-compatible devices to accomplish both the alarm and the hook set. In addition, many of the bite indicators only work with a particular type of reel, for a particular type of fishing, or for a particular set of conditions. Attaching these alarm devices to the fishing rod can disrupt the natural balance achieved by matching the proper rod to a proper reel and further could be a possible snagging hazard when fighting and reeling in a fish. The art of trolling for fish uses many techniques such as trolling with downriggers, side planner boards, towing top water baits, towing deep diving baits, and towing free line baits, as well as many different weighted baits such as the Carolina rig method, the use of lead core fishing lines, and including the use of multiple rods and lines using different techniques simultaneously. Types of rod holders used in trolling with baits vary as to the trolling technique. Therefore, rod holders are usually pre-chosen and pre-existing on the watercraft used for trolling baits. Hence, a fish alarm system that is contained inside or is also a rod holder is not necessary nor a good alternative to preferred existing fishing equipment such as rod holders. A fish-bite indicator may use a sensor, timer, gated oscillator, and counter, in other words, many sophisticated internal components rendering the indicator very complicated to repair when there is a component malfunction. The noise generated from an engine used to propel a boat when trolling for fish sometimes may become very loud and in some cases the pilot house of the boat and the pilot may be a considerable distance from the alarm system. This leads many to suggest a very loud audible alarm. There are at least two problems with the very loud audible alarm. The alarm could be interpreted by another boat within the audible range of the alarm as a distress signal and the alarm could signal to other boats within the audible range of the alarm that fish are being caught by the boat with the alarm and many boats will move closer to the boat with the alarm causing a disruption of the fishing in the area of the boat with the alarm.

An alarm is needed that may provide for hook setting in the mouth of a fish without an elaborate external spring mechanism. There is clearly needed a simple device that may not encumber the fishing rod and or line while fighting and landing a fish, that is suited to the many techniques employed by fishermen to catch fish, that contains components that can be purchased from several different suppliers in the event that a component should malfunction or brake, and that is extremely easy to use and applies to many if not all types of fishing techniques. A device is needed that requires no adjustments or options except when used in the most extreme conditions where an additional external spring may easily be installed. There is a need for an easy to use, simple fish alarm system for various conditions and requirements.

SUMMARY

The present invention describes a fish alarm system including an alarm toggle switch having an at least two position switch for activating alarms and beginning the hook set process; an alarm toggle arm wherein movement of the alarm toggle arm from an off position to an interim position may activate the alarm, and movement to a hook set position may begin a hook set process; a tension clip for releasing a fishing line, wherein the tension clip is attached with the alarm toggle arm, wherein tension may allow a force on the fishing line to move the alarm toggle arm from the alarm toggle arm off position, to the alarm toggle arm bite position, and to the alarm toggle arm hook set position then release the fishing line from the tension clip as the tension further increases whereby the fishing line is free to interact directly with a rod and a reel; an enclosure; an alarm; and a power source. Different embodiments may comprise different additional features and different combinations including but not limited to: different types of alarms including visual, audio, and remote; different placements of external springs for greater variety of alarm toggle switch tension; and a courtesy light for convenience with night or low light fishing.

BRIEF DESCRIPTION OF THE DRAWINGS

The features, aspects, and advantages of the invention will become better understood with regard to the following description, appended claims, and accompanying drawings where:

DETAILED DESCRIPTION OF THE INVENTION

The present invention relates to the field of fish alarms and more specific to a device that may be used by fishermen to alert the fisherman of a fish bite. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

Figure 1:
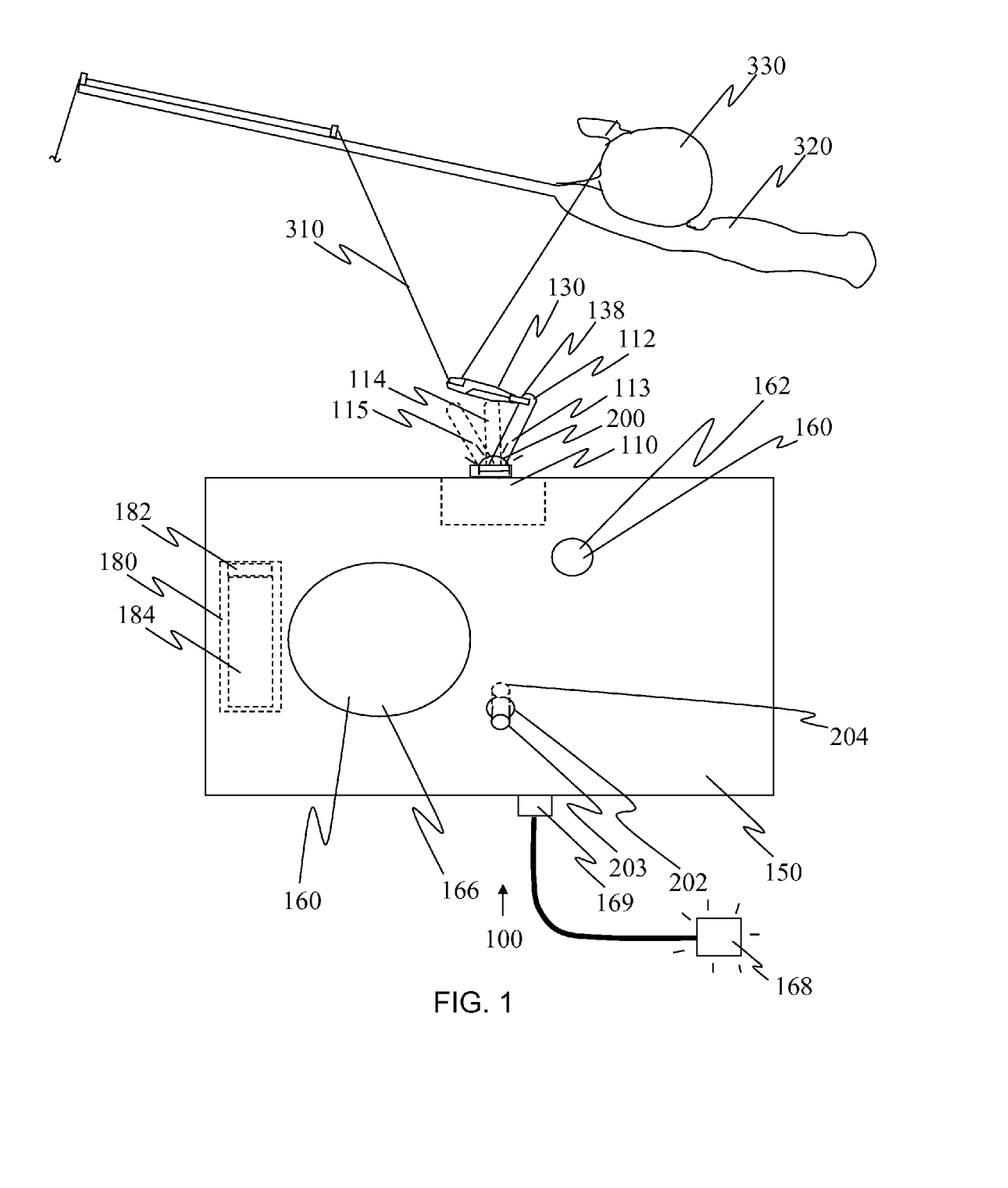
FIG. 1 is a side view of one embodiment of a fish alarm system illustrating the relationship of the fish alarm system with a rod, reel, and fishing line according to the present invention.

Overview:

FIG. 1 depicts a fish alarm system 100 comprising: an alarm toggle switch 110 and a tension clip 130; an enclosure 150; an alarm 160; and a power source 180; wherein the alarm toggle switch 110 is attached within the enclosure 150 and the alarm toggle switch 110 may include an alarm toggle arm 112 wherein the alarm toggle arm 112 extends from the alarm toggle switch 110 and is disposed through the enclosure 150, wherein the alarm toggle arm 112 may be sealed watertight with the enclosure 150 and the tension clip 130 is attached with the alarm toggle arm 112 such that a fishing line 310 may be inserted in the tension clip 130, wherein as the force on the fishing line 310 increases, the tension of the tension clip 130 allows the alarm toggle arm 112 to move from an off position 113 to an interim or bite position 114 for activating the alarm 160, from the interim position 114 to a hook set position 115 for hook set, and then release the fishing line 310 from the tension clip 130 as the tension further increases whereby the fishing line 310 is free to interact directly with a rod 320 and a reel 330; wherein the enclosure 150 may be watertight whereby protecting electrical components and circuits within the watertight enclosure 150 from moisture; and wherein the alarm 160 for fish bite alerting may be attached with the enclosure 150, and the power source 180 is electrically connected with the alarm toggle switch 110 and the alarm 160 whereby electrical power is available for the alarm 160.

Figure 2:
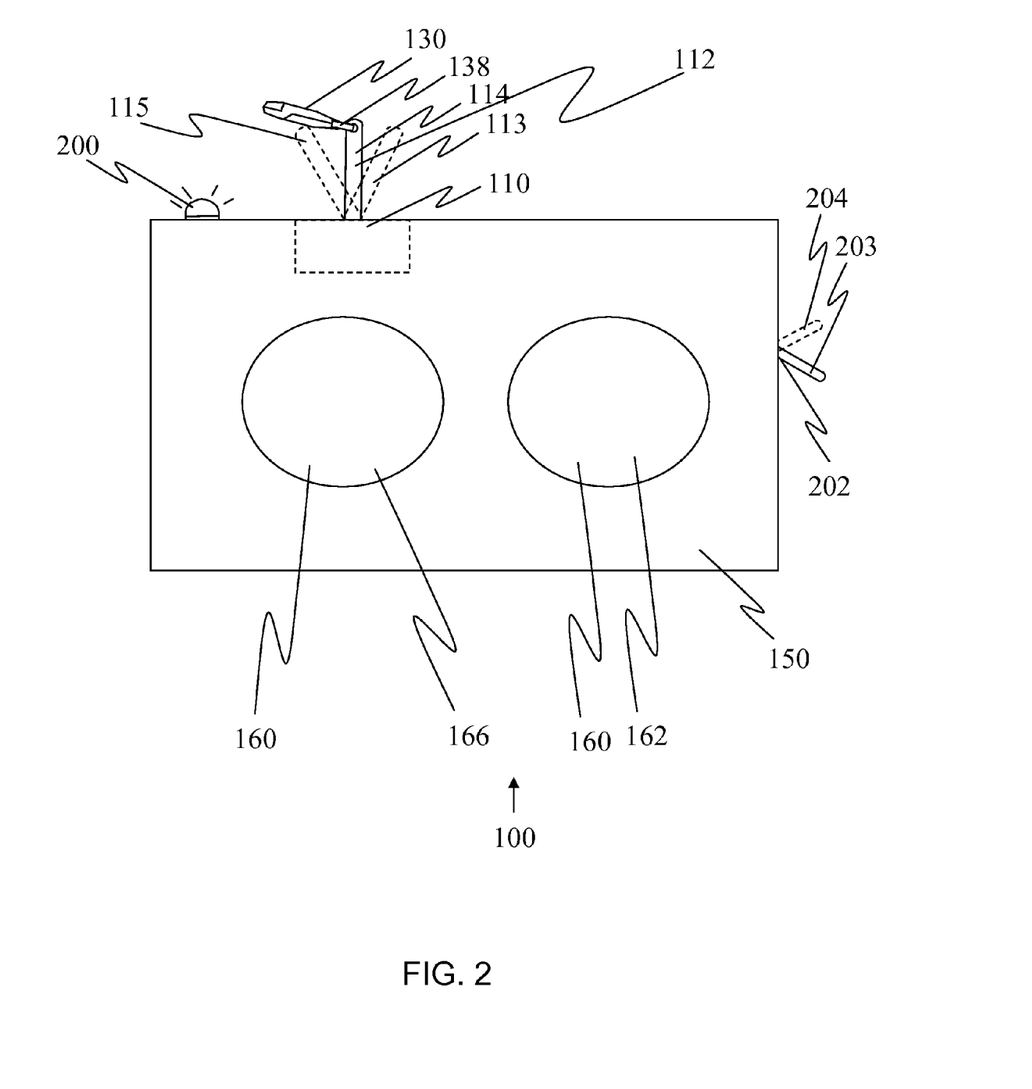
FIG. 2 is a side view of another embodiment of the fish alarm system according to the present invention.

Design Specifications:

FIGS. 1 and 2 illustrate a fish alarm system 100 having an alarm toggle switch 110 and a tension clip 130; an enclosure 150; an alarm 160; and a power source 180. The fish alarm system 100 relates to fishing alarms that may be audible and/or visual with hook setting capabilities, and may have distant signal transmission capabilities.

FIGS. 1, 3B, 5, and 7 depict that the alarm toggle switch 110 may function as an off-on switch for the alarm 160. The alarm toggle switch 110 may include an at least two position alarm toggle switch 110. The alarm toggle switch 110 alarm toggle arm 112 may include an O-ring to seal the alarm toggle switch 110 where the alarm toggle arm 112 extends through the aperture of a watertight enclosure 150. The alarm toggle switch 110 with the alarm toggle arm 112 may include a certain resistance to movement between positions and may move from the off position 113 to the hook set position 115 with a certain amount of force. When a third position is included, the alarm toggle arm 112 may move from the off position 113 to the interim position 114 to the hook set position 115 such that the hook set process may be accomplished and a second alarm may be activated. For example with a HONEYWELL NT series, flat base, manual, sealed toggle switch, to move the toggle arm 112 from the off position 113 to the interim position 114, required approximately one pound of force to move the distance of approximately four mm and to move from the interim position 114 to the hook set position 115 required approximately two pounds of force to move the distance of approximately five mm. With some embodiments for extreme conditions, the amount of resistance to move from the off position 113, to the interim position 114, to the hook set position 115 may be adjusted by the use of an external spring. An example of one of several switches that may be used as the alarm toggle switch 110 include a double pole, three position switch such as the HONEYWELL NT series, flat base, manual, sealed toggle switch with optional panel stand-off with O-ring panel seal. The HONEYWELL switch has a spring-loaded actuating mechanism. In one embodiment the alarm toggle switch 110 may be electrically connected to the power source 180 and to the alarm 160. The alarm toggle switch 110 may be wired such that the three position alarm toggle switch 110 activates the alarm 160 when the three position alarm toggle arm 112 is moved from the off position 113 to the interim or bite position 114 and may remain on in the hook set position 115. In another embodiment, two distinct alarms 160 or alarm signals may be connected with the three position alarm toggle switch 110 with one alarm 160 connected with the interim or bite position terminal of the three position alarm toggle switch 110 and another distinct alarm 160 connected to the hook set position terminal of the three position alarm toggle switch 110 such that the two distinct alarms 160 may clarify the difference between whether the bait has been bitten by a fish but the fish has not been hooked verses when the bait has been bitten and a fish has also been hooked. Generally trolling for fish is done with multiple rods and the possibility is always present that multiple fish will set off multiple alarms simultaneously. When the bite alarm sounds and then the hook set alarm sounds the fisherman will be able to direct his immediate attention to the alarm 160 that signals that the fish has been hooked. Moving the alarm toggle arm 112 back to the off position 113 may deactivate and reset the fish alarm system 110. One function of the alarm toggle switch 110 is to conduct power from the power source 180 to the various alarms 160 when the alarm toggle arm 112 of the alarm toggle switch 110 is moved from the open or off position 113 to the closed, interim or hook set position 114 or 115. When the alarm toggle arm 112 is in the normal off position 113, it is performing the function of an off switch. When the fish bites the bait, tension on the fishing line 310 causes the alarm toggle arm 112 to move to the bite or interim position 114 connecting the power supply to an alarm 160 causing the visual alarm 162 and/or audio alarm 166 to activate wherein the alarm toggle switch 110 is functioning as an on switch. Due to tension on the fishing line caused by the biting fish, the three position alarm toggle arm 112 may move from the interim position 114 then to the hook set position 115 and the hook may set. With the alarm toggle arm 112 movement to the hook set position 115 with the three position alarm toggle switch 110, another connection may be made by the alarm toggle switch 110 such that the power source 180 may be connected to another alarm 160 or alarms 160 causing other audio alarms 166 and/or visual alarms 162 to activate and simultaneously opening the connection that was established when in the interim or bite position 114 whereby the alarm toggle switch 110 is again functioning as an off-on switch. After any alarm sounds or activates, the alarm toggle arm 112 may be moved to the original position 113 and any or all of the alarms 160 may be deactivated. With movement of the alarm toggle arm 112 of the alarm toggle switch 110 from the hook set position 115 to the interim position 114 to the off position 113, the alarm toggle switch 110 is acting as an off switch. The fish alarm system 100 does not require an off-on switch as the alarm 160 uses no power during storage however an off-on switch could be added as an option. An unused or designated remote terminal or a parallel connection with the used terminals on the alarm toggle switch 110 may be used for connecting the alarm toggle switch 110 with at least one remote alarm 168 through one or more water proof connections 169 on the enclosure 150. In one embodiment, the power source 180 may be electrically connected with the water proof connection 169 such that the power source 180 may be an external power source connected through terminals of the water proof connection 169. With another embodiment, a battery charger may be electrically connected with the water proof connection 169 such that the external power source connected through the water proof connection 169 may supply electrical power for charging the battery. For embodiments including the water proof connection 169, the water proof connection 169 may include the remote alarm 168 connection, the external power connection, or the battery charger connection or any combination of these connections. The alarm toggle switch 110 may include an aperture in the top of the alarm toggle arm 112 for attaching the alarm toggle arm 112 with the tension clip 130 and/or the external spring 212. Preferably, the alarm toggle switch 110 may include a double pole, three position switch 110 that may be attached with the enclosure 150 inside of the enclosure 150 approximately midway between the forward top edge of the enclosure 150 and the aft top edge of the enclosure 150 with the double pole, three position alarm toggle switch 110 disposed with an aperture in the enclosure 150 such that an alarm toggle arm 112 protrudes through the aperture of the enclosure 150. The approximately midway position for the alarm toggle switch 110 on the enclosure 150 allows the fish alarm system 100 to be mounted either on the left or right side of the rod holder 340 for an ambidextrous capability. For bait casting reels the three position alarm toggle switch 110 may be placed on the bottom side of the enclosure 150 by mounting the enclosure 150 upside down.

As depicted in FIGS. 1, and 2, the tension clip 130 holds and releases the fishing line 310 by providing tension for retaining the fishing line 310 up to a certain tension or force and then releasing the fishing line 310. An adjustable tension clip 130 may provide a jaw type fishing line 310 release wherein the jaw members are spring biased toward the holding position and a variety of line holding forces may be produced from a compression spring by adjustment. Spring biased jaw members may eliminate the requirement of threading the fishing line 310 through an alarm device thus enhancing the convenience of the user. The fishing line 310 may be inserted in the tension clip 130 wherein as the force on the fishing line 310 increases, the tension of the tension clip 130 allows the alarm toggle arm 112 to move from an off position 113 to an interim or bite position 114 for activating the alarm 160, from the interim position 114 to a hook set position 115 for hook set, and then to release the fishing line 310 from the tension clip 130 as the tension further increases whereby the fishing line 310 is free to interact directly with a rod 320 and a reel 330. The process of setting the hook in the mouth of the fish is first begun with the fish pulling on the bait against the tension of the alarm toggle arm 112 as the alarm toggle switch 110 is working to keep the alarm toggle arm 112 in the off, or ready, position 113. However, the alarm toggle switch 110 may toggle to the bite or interim position 114 as the fish continues to pull on the bait. As the fish continues to pull on or run with the bait the toggle may move to hook set position 115 and move no further which causes the fishing line 310 to come to a sudden stop completing the hook set. Further tension applied by the fish running on the fishing line 310 may then cause the fishing line 310 to be released from the tension clip 130 such that the fishing line 310 and the fishing rod 320 are free from the fish alarm system 100. An important factor here is the alarm toggle switch 110 alarm toggle arm 112 with resistance in the transition from the off position to the bite or hook set position. With the shorter alarm toggle arm 112 and with the attachment aperture closer to the fulcrum of the alarm toggle arm 112 there will be an increase in the required force for movement such that there is less need for additional resistance. Examples of tension clips may include but are not limited to: The Adjustable Tension Fish Line Release described in U.S. Pat. No. 5,163,246 issued to Byron Shaw Nov. 17, 1992; The Adjustable Tension Fish Line Release described in U.S. Pat. No. 4,698,933 issued to Byron Shaw Oct. 13, 1987; or other clips with jaw members for holding and releasing the fishing line 310 with a tension means that may include a spring for adjusting the amount of tension required to release the fishing line 310. The tension clip 130 is attached with the alarm toggle arm 112. One embodiment may use a circular clip 138 to attach the tension clip 130 with the alarm toggle arm 112 with a preferred embodiment using a 22 mm diameter circular key ring for joining the tension clip 130 with the alarm toggle arm 112.

FIGS. 1, 2 and 4 through 7 depict the enclosure 150 for containing and providing protection for electrical components and wire connections while in prolonged exposure to the elements such as water or salt water. Components may be openly exposed to the moist atmosphere resulting from the spray of water caused by the wind blown water spray associated traveling to a desired fishing spot at a high rate of speed in a high speed water craft. The fish alarm system 100 may use the watertight enclosure 150 containing these electrical components and their wire connections with military grade externally sealed switches with all attachments sealed at the attachment location of the watertight enclosure 150. In addition, the alarm 160 may be a sealed alarm that is also sealed where the alarm 160 attaches with the watertight enclosure 150. A courtesy light 200 or visual light 162 may be sealed with a gasket or a lens cap with an O-ring or gasket where the courtesy light 200 or visual alarm 162 attach to the watertight enclosure 150. A preferred embodiment of the watertight enclosure 150 may be a HAMMOND watertight polycarbonate enclosure with dimensions of approximately 2.4 inches by 2.5 inches by 4.7 inches. The enclosure 150 is easy to construct needing only a few holes drilled in a standard enclosure for the desired switches, alarms, lights, and fixtures.

FIGS. 1, 2, 3A, 3B, 3C, 6, and 7 depict alarms 160 that may be audible 166, visual 162, and/or may have distant signal transmission capabilities. Where the visual alarm 162 is desirable, the visual alarm 162 may include a waterproof panel mount with LED holders. Another embodiment may use visual lights 162 sealed with a gasket, a lens cap with an O-ring, or gasket where the light or visual alarm 162 attach with the watertight enclosure 150. Some embodiments may use the audio alarm 166 having an adjustable volume warble audio alarm. A preferred embodiment may use a FLOYD BELL, piezo maximum 103 dB(A), at 2 feet audible alarm with gasket. The audio alarm 166 may be purchased with a volume adjustment option which is a plastic molded cover which when rotated diminishes the volume. Still other embodiments may include at least one remote alarm 168. The noise generated from an engine used to propel a boat when trolling for fish sometimes may become very loud and in some cases the pilot house of the boat and the pilot may be a considerable distance from the fish alarm system 100. In addition, it is important for the pilot of the boat to be alerted, as well as the fisherman tending the trolled baits, that a fish has bitten the bait or has been hooked since the pilot may need to control the watercraft to aid the fisherman when the fisherman is fighting and landing the fish. When a remote alarm 168 is required, such as the pilot of the watercraft in a remote location from the position of the fishing rods, and/or the alarm volume is used at a very low decibel level, a water proof connection 169 may be connected to the alarm toggle switch 110. The water proof connection 169 may be connected in parallel with the bite alarm connection of the alarm toggle switch 110. The water proof connection 169 may be also connected in parallel with the hook set alarm connection of the alarm toggle switch 110. With the double pole, three position alarm toggle switch 110, unused terminals of alarm toggle switch 110 may be used for connection of the water proof connection 169 for remote alarm communication. The remote alarm communication may be accomplished by way of signal transmission, wireless connection, or by direct connection with a waterproof electrical cord between the water proof connection 169 and the remote alarm. An electrical connection with the water proof connection 169 may directly activate one or more remote alarms 168 that may be audible, visual and/or vibrate which may be carried by or are in close proximity to: the pilot controlling the boat, fishermen tending the trolled baits, or others needing alarm information. Further, trolling to catch fish may involve the use of sonar and GPS in combination with nautical maps to mark areas where fish are located. The pilot of a water craft may desire to concentrate his trolling efforts on the areas of greatest numbers of fish. Marking the areas on the GPS system and nautical map where high concentrations of fish are located is a common practice. Trolling over these concentrations of fish may be done with several different baits, at several different depths, several different bait rigging techniques, and several different speeds. Sometimes fish may strike bait in an area that is free of hooks, therefore there is no chance of catching this biting fish. However with the bite alarm feature of the fish alarm system 100, the pilot may mark the necessary data with the location, trolling speed, and depth of actively biting fish. The fisherman tending the rods 320 may also desire to be notified that a bite has occurred so as to check and to replenish the bait, or to place a hook in the bite target area of the fish in the bait. The fisherman tending the rods 320 may use the feedback of the alarm bite feature to concentrate his efforts on the most opportunistic baits and depths preferred by actively biting fish. The signal transmitter may not need to be contained within the enclosure 150 wherein a water proof connection 169 may be provided as well as a water proof connection cord. The signal transmitter, whether placed inside or outside the enclosure 150 of the fish alarm system 100 may include a transmitter that is capable of signaling to, various existing devices and using one or more frequencies singly or in concert commonly found on water craft such as frequencies used with: speed and temperature monitors, sonar screens, depth finders, GPS systems, marine radios including DSC and VHF, computers, CB radios, FRS/GMRS radios, including all combinations of the these devices and multiple bands of these devices. The frequencies or the signal may be pre-set or adjustable to match the receiving device. With another embodiment, the addition of a relay 170 inside the watertight enclosure 150 allows two distinct audio 166 and/or visual alarms 162 to sound or activate in concert. The movement of the three position alarm toggle arm 112 from the off position 113 to the bite position 114 will cause the first distinct audible and/or visual alarms to activate and also close a circuit in the relay 170 as when bait has been bitten. When the alarm toggle arm 112 continues to move to the hook set position 115 from the bite position 114, the second distinct audio and/or visual alarms will activate and power is also provided at the relay 170 such that the first distinct alarms will continue to remain active. All of the audio and/or visual alarms may be active in concert. When further tension is applied by a hooked and running fish the fishing line 310 will be released from the tension clip 130 and the fish may be reeled in. To turn off or deactivate the alarms 160, the alarm toggle switch 110 may be moved to the original off or ready position 113 at any time. In another embodiment with an emergency in nearby proximity, there is also a third feature. With the audio apertures fully open we now have a very loud alarm approximately 92 db(A) at each audio alarm 166 times two with two audio alarms 166. If the embodiment, is equipped with the relay 170 and two or more audio alarms 166 including audio apertures, for an emergency distress signal simply open the audio apertures with the audio alarm 166 to the maximum and move the three position alarm toggle switch 110 to the hook set position 115. Attention may be drawn if the alarm 160 is not silenced in a short period of time. In addition, with two simultaneous remote signals being sent, the receiver of such a signal may respond if the alarm 160 is not silenced within a short period of time.

Figure 3A:
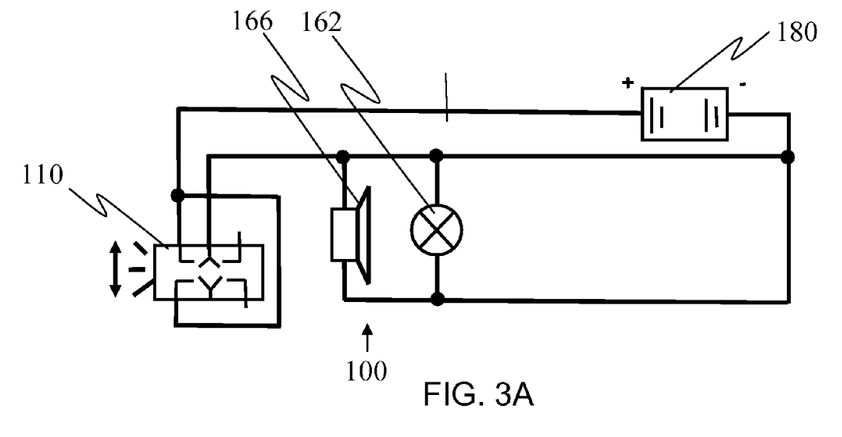
FIG. 3A is a circuit diagram of one embodiment of the fish alarm system according to the present invention.
Figure 3B:
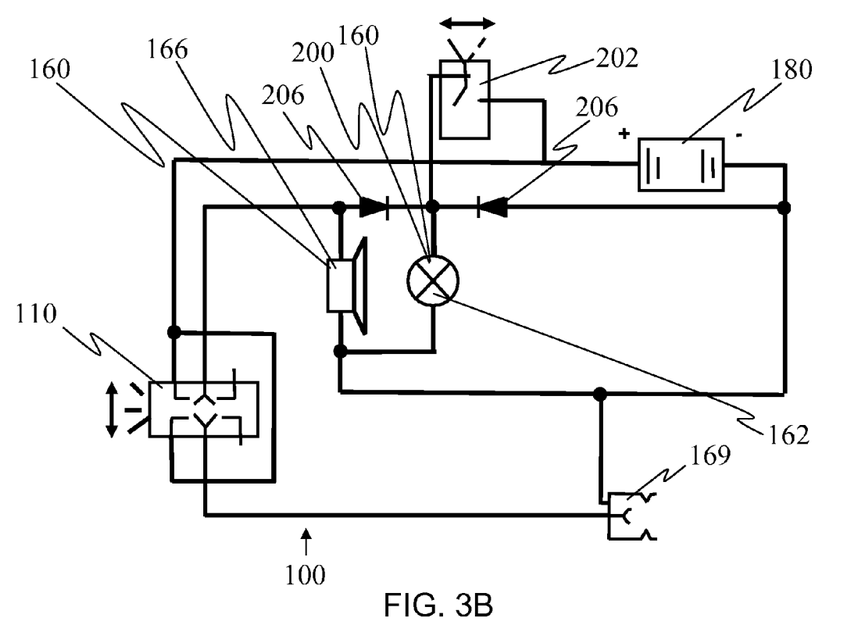
FIG. 3B is a circuit diagram of another embodiment of the fish alarm system according to the present invention.
Figure 3C:
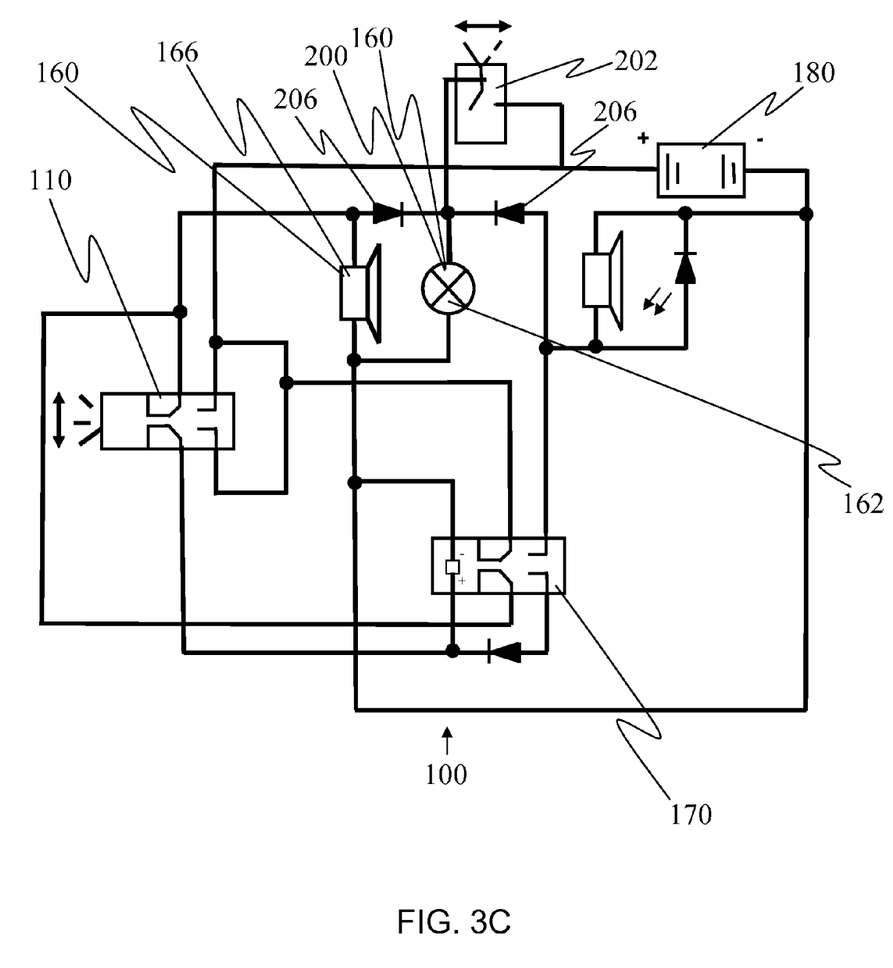
FIG. 3C is a circuit diagram of yet another embodiment of the fish alarm system according to the present invention.

As illustrated in FIGS. 1, 3A, and 3B, the fish alarm system 100 uses a power source 180 with the alarm 160 and the courtesy light 200. The power source 180 may be electrically connected with the alarm toggle switch 110 and the alarm 160, and with embodiments including the courtesy light 200 with the courtesy light off-on switch 202 and the courtesy light 200. In a preferred embodiment, the power source may include a KEYSTONE nine volt battery clip 182 attached inside the enclosure 150 for use with a nine volt battery 184. Additional embodiments may provide for external power and or battery charging from the external power source connected through the water proof connector 169.

The fish alarm system 100 may include a courtesy light 200, as shown in FIGS. 1, 2, 3B, and 4, with a courtesy light off-on switch 202 for turning the courtesy light 200 on and off. One embodiment may include a two position courtesy light off-on switch 202 with the courtesy light switch 202 on in the on position 204 and off with the courtesy light switch 202 in an off position 203. A diode 206 may be included to allow the courtesy light 200 to be turned on without activating the audible alarm 160. The courtesy light 200 may be used to facilitate inserting the fishing line 310 into the tension clip 130 during time of minimal light or the darkness of night fishing. In a preferred embodiment the courtesy light 200 may include a visual white signal light.

Figure 6:
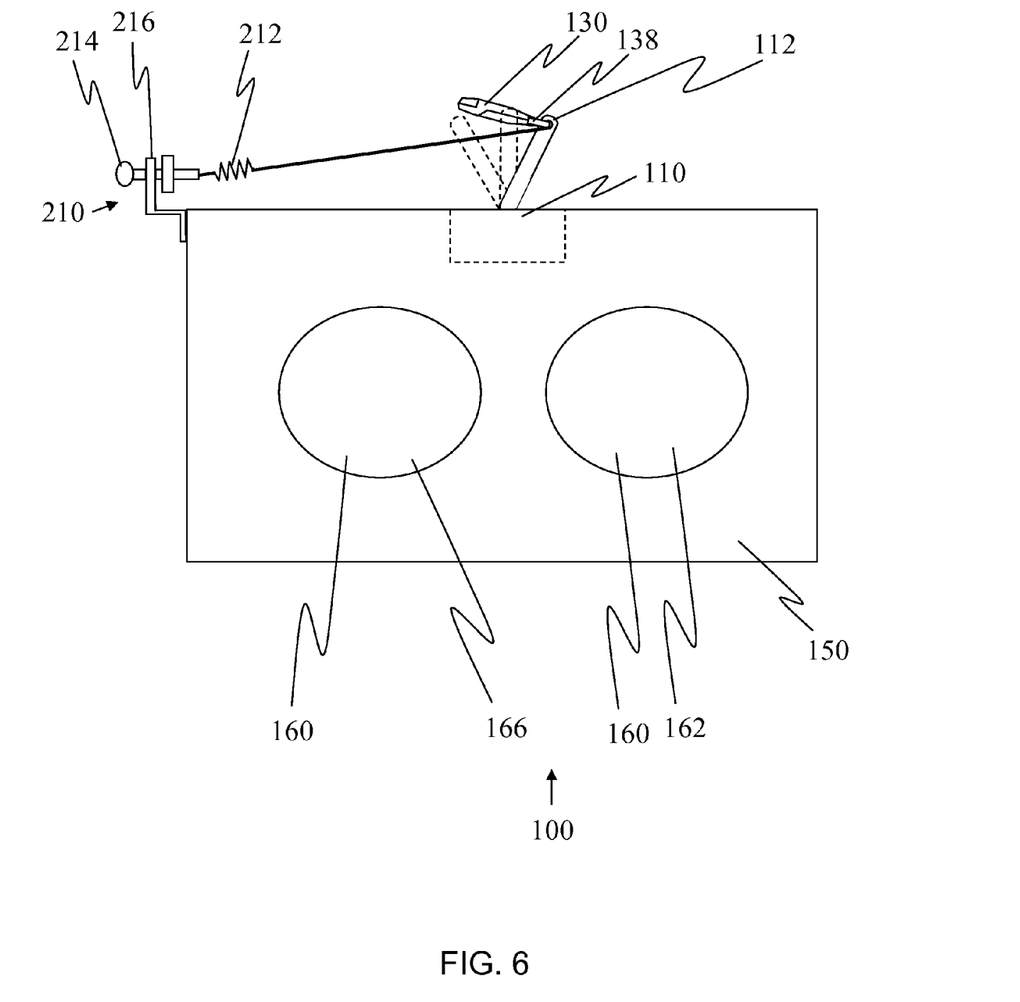
FIG. 6 is a side view of one embodiment of the fish alarm system with an external spring for decreasing tension to activate the alarm according to the present invention.
Figure 7:
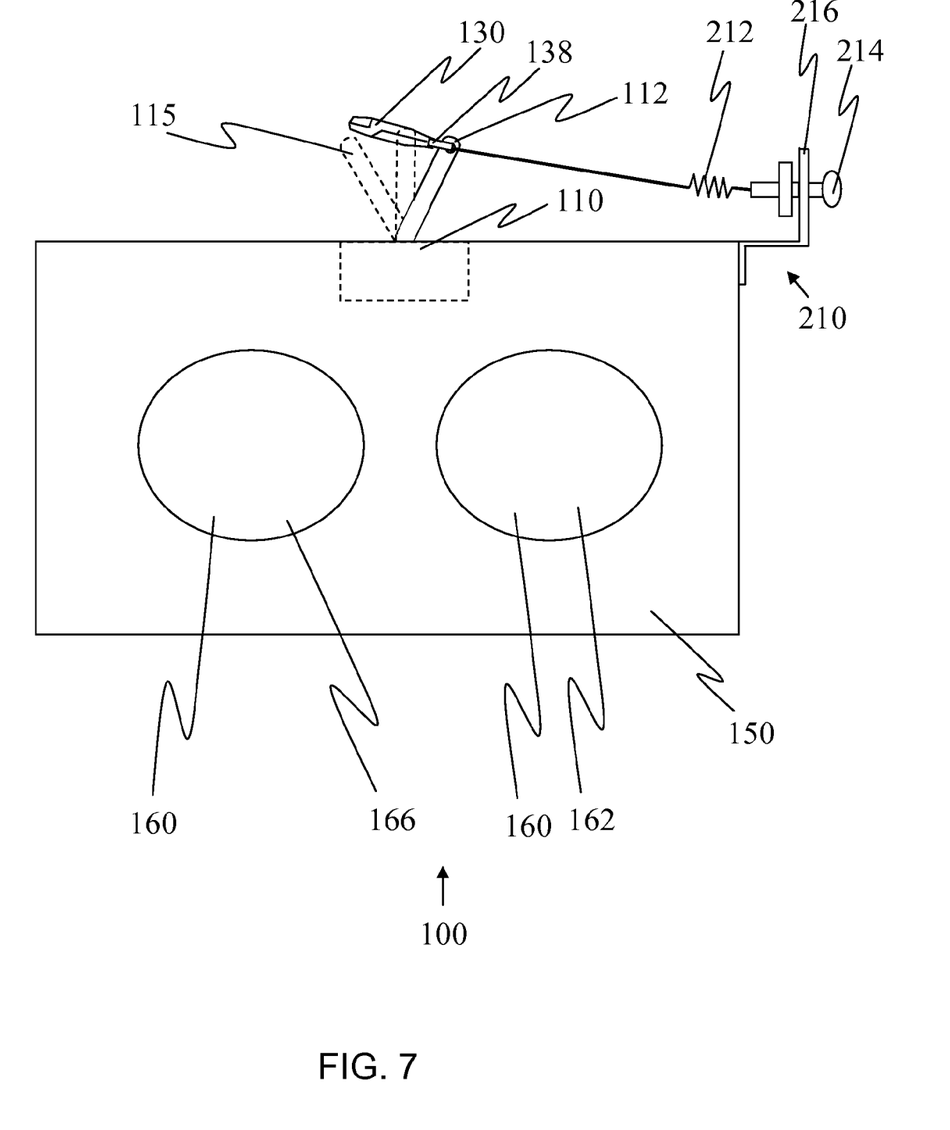
FIG. 7 is a side view of one embodiment of the fish alarm system with an external spring for increasing tension to activate the alarm according to the present invention.

Since there will be extremes in the application of a product and the fish alarm system 100 may be used for very small pan fish or very large predators of the oceans, an external spring assembly 210, as illustrated in FIGS. 6, and 7, may be used to control the movement of the alarm toggle arm 112 in extreme applications. To use the fish alarm system 100 for smaller fish all that is necessary is the addition of an external spring assembly 210 including an external spring 212, an adjustable tension thumb screw 214, and an external spring anchor bracket 216 with attaching hardware. The external spring assembly 210 may be anchored externally on the enclosure 150 of the fish alarm system 100 at a top end of the enclosure forward of the alarm toggle switch 110 and attached with the aperture in the alarm toggle arm 112 used for attaching the tension clip 130 or the circular clip 138, and the external spring assembly 210 may be adjusted with the adjustable tension thumb screw 214 to create the desired pre-tension on the alarm toggle switch 110 so as to loosen the tension required to trip the switch mechanism creating a hair trigger effect. To use this invention for large ocean predators requiring large baits wherein large tension forces may be created on the alarm toggle switch 110; the external spring assembly 210 may be anchored on the top side of the enclosure 150 aft of the alarm toggle switch 110 and the external spring assembly 210 may be adjusted with the adjustable tension thumb screw 214 so as to increase the tension required to trip the alarm toggle switch 110. In one embodiment where the alarm 160 may be used only as an alarm for use with downriggers the, the alarm toggle switch 110 could be turned 180 degrees and the external spring assembly 210 may be mounted and tensioned to activate the alarm 160 when the fishing line 310 looses tension. The feature of the hook set may be diminished when the fish alarm system 100 is used with downriggers in this manner however hook setting is an accepted byproduct of using downriggers and therefore the hook setting becomes a redundant feature.

Figure 4:
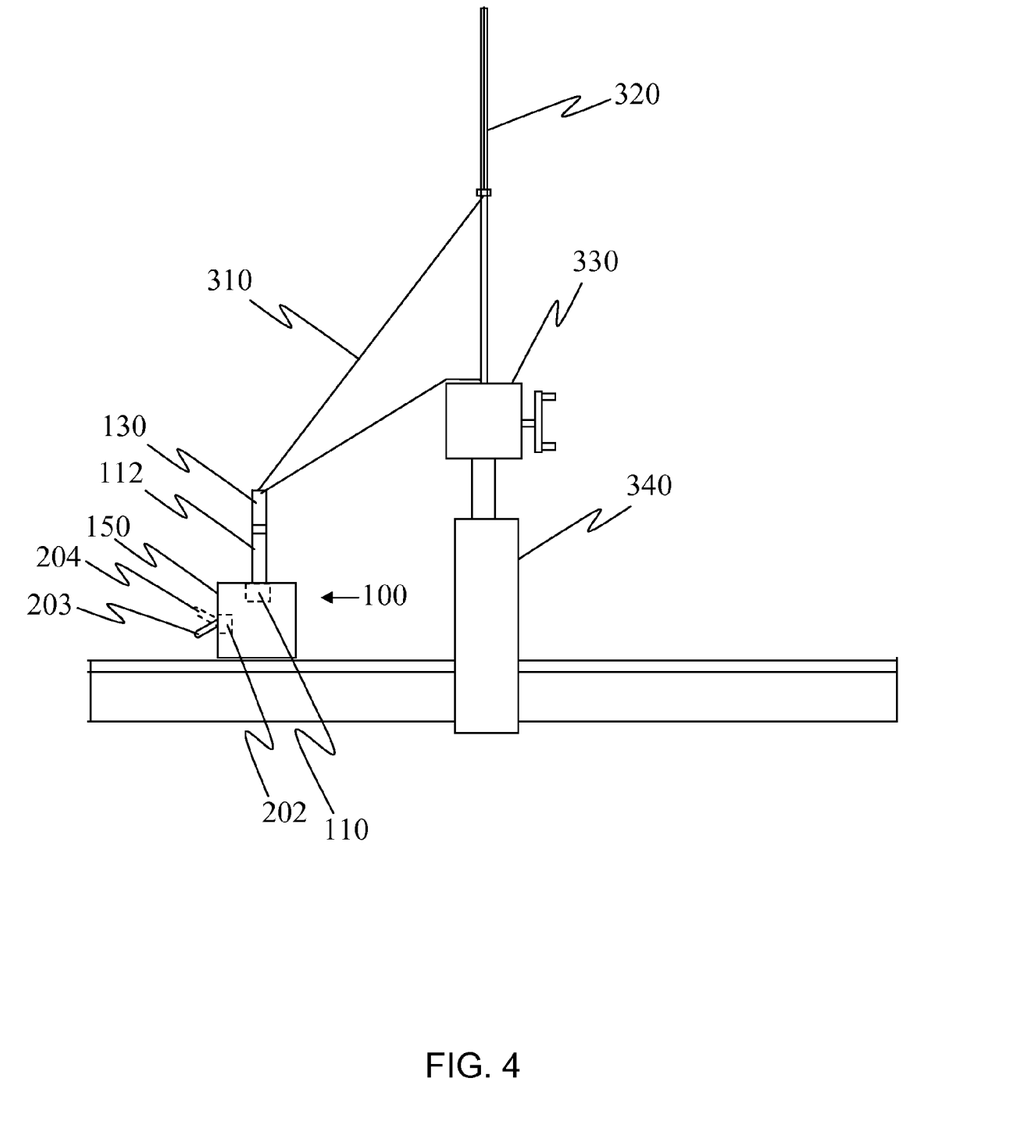
FIG. 4 is a rear view of another embodiment of the fish alarm system with the fish alarm mounted separate from the rod holder according to the present invention.
Figure 5:
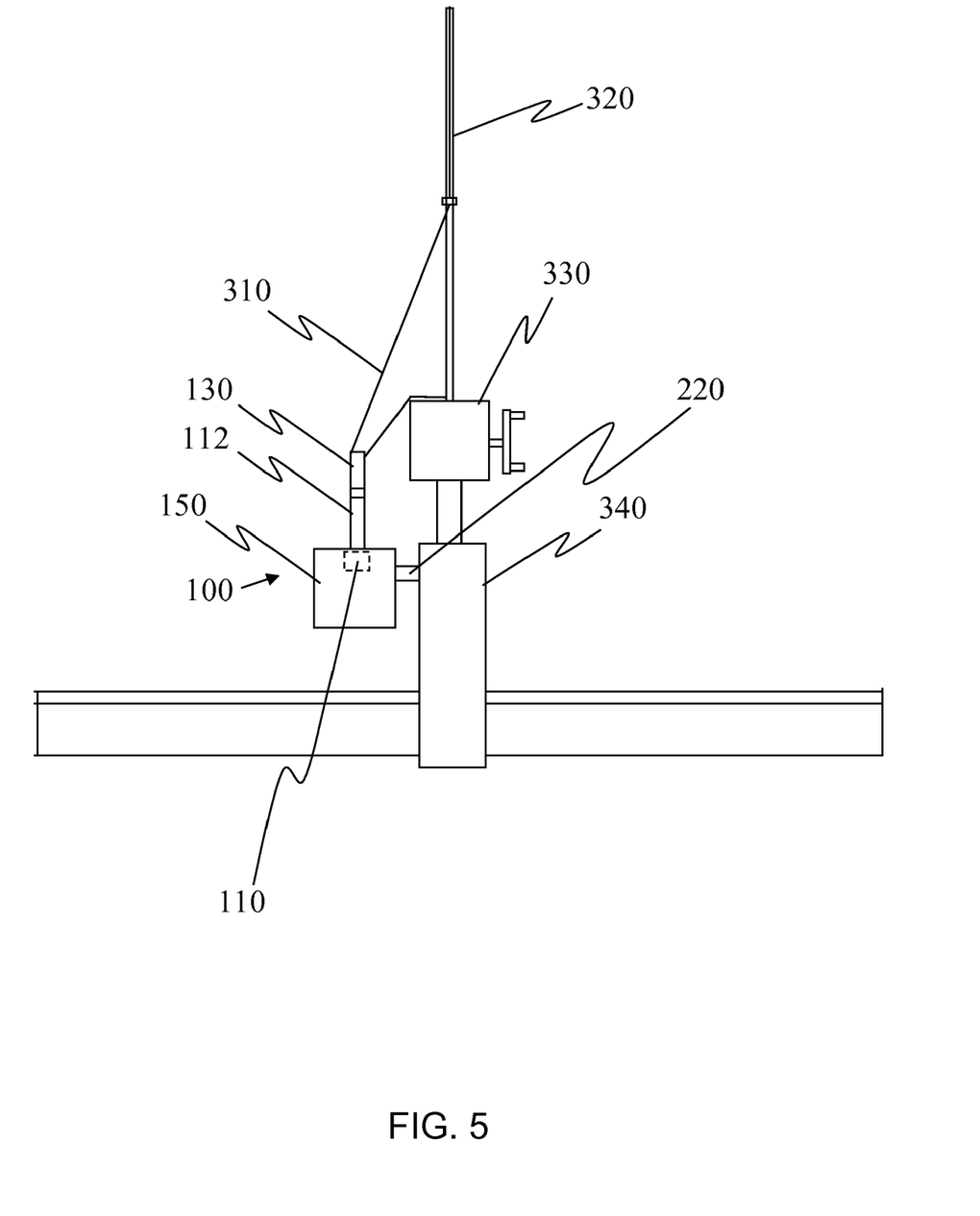
FIG. 5 is a rear view of an embodiment of the fish alarm system with the fish alarm attached with the rod holder according to the present invention.

As shown in FIGS. 4 and 5, the fish alarm system 100 may be attached with the rod holder 340 or the fish alarm system 100 may be attached to another structure separate from the rod holder 340. The fish alarm system 100 may include a rod holder spacer 220 for attaching the fish alarm system 100 with the rod holder 340. A steel plate may also be included in the enclosure 150 for stability and reinforcement when attaching to rod holders 340.

As illustrated in FIGS. 1, 4, and 5, novel features of the FISH ALARM SYSTEM may include: The only modification necessary to existing off the shelf parts used in the fish alarm system 100 may be drilling an aperture or a hole in the top of the alarm toggle arm 112 and drilling of the needed holes in the watertight enclosure 150 where the desired components are installed and sealing the attachments of the components and the watertight enclosure 150; the fish alarm system 100 is not attached with the rod 320 and thus the rod 320 is not encumbered; the hook may set in the fish with the adjustable tension clip 130 tension adjustability; and the user may have an indication of a bite, a run with the bait, and setting the hook. The tension from the fish pulls the alarm toggle arm 112 from the off position 113 to the bite position 114 for activating the alarm 160, from the bite position 114 to the hook set position 115 for hook set, and then releasing the fishing line 310 from the tension clip 130 as the tension further increases whereby the rod 320 and reel 330 can be utilized to land the catch.

Manner of Use:

As shown in FIGS. 1, 4, and 5, the fish alarm system 100 may be used by: mounting the fish alarm system 100 in a close proximity to an existing structure where the rod 320 and reel 330 may be placed; placing or casting the bait in a desired location as would normally be done; placing the fishing rod 320 in its resting place, rod holder 340 or side rail of a fishing pier, inserting the fishing line 310 into the tension clip 130; grabbing the fishing rod 320 and reeling in the fish, when the alarm 160 sounds and the hook is set and the fishing line 310 is released from the line clip 130. The alarm toggle switch 110 may be moved to its original off position 113 at any time for deactivating the alarm 160 or preparing the alarm 160 to repeat the process. This process may be repeated time and again without adjustments. Any time the fishing line 310 is removed from the tension clip 130, the toggle arm 112 is placed in the off position 113, and the alarm 160 is not in use, the fish alarm system 100 becomes dormant, as when fishing is complete at the end of the day. The alarm 160 is now dormant and can remain in that state, until the next time it is used.

What is claimed is:

1. A fish alarm system comprising:
an alarm and a second alarm; a power source; an enclosure; and in combination an alarm toggle switch and a tension clip;
wherein the alarm toggle switch includes a three position switch including an off position, an interim position, and a hook set position;
wherein the alarm toggle switch is attached within the enclosure and the alarm toggle switch includes an alarm toggle arm disposed through the enclosure;
wherein the alarm is attached with the enclosure and the alarm is disposed through the enclosure such that the alarm may alert a user; whereby the enclosure protects electrical components and circuits within the enclosure;
wherein the power source is electrically connected with the alarm toggle switch and the alarm whereby electrical power is available for the alarm; wherein the alarm toggle switch further includes a specific amount of force required to toggle the alarm toggle arm from the off position, located aft of a mid vertical position of the alarm toggle switch, to the interim position, located at a mid position aligned with the mid vertical position of the alarm toggle switch, and then to the hook set position, located forward of the mid vertical position of the alarm toggle switch, wherein the specific amount of force required to toggle the alarm toggle arm from the off position, to the interim position, and then to the hook set position, is increased as the force exerted by a fishing line is increased; and wherein a circular ring clip attaches the tension clip with the alarm toggle arm such that the fishing line may be inserted in the tension clip wherein as the force on the fishing line increases, a tension of the tension clip allows the alarm toggle arm to toggle from the off position to the interim position and activating the alarm from a bite to indicate a bite alarm such that the interim position may be used for activating the alarm from the bite before a hook set, and as the force on the fishing line further increases, the tension of the tension clip allows the alarm toggle arm to toggle from the interim position to the hook set position for the hook set and activating the second alarm from the hook set to indicate a hook set alarm, and then to release the fishing line from the tension clip as the tension further increases whereby the fishing line is free to interact directly with a rod and reel and the alarm toggle arm is physically toggled to its original off position to deactivate the alarm.

2. The fish alarm system according to claim 1 wherein the enclosure is a watertight enclosure, wherein the watertight enclosure is sealed with the alarm toggle arm, and is sealed with the alarm whereby the watertight enclosure protects the electrical components and circuits within the watertight enclosure from moisture.

3. The fish alarm system according to claim 1 wherein the tension clip is an adjustable tension clip wherein the adjustable tension clip comprises jaw members that are spring biased toward a holding position producing a variety of holding forces from a compression spring whereby the tension of the clip may be adjusted for the desired tension for releasing the fishing line such that the fishing line may be inserted in the spring biased jaw members wherein as the force on the fishing line increases, the tension of the tension clip allows the alarm toggle arm to toggle from the off position to the hook set position for activating the alarm from the hook set, whereby the tension of the clip may be adjusted by adjusting the compression spring for the desired tension for releasing the fishing line.

4. The fish alarm system according to claim 1 wherein the adjustable tension clip comprises a fish line release, the fish line release consisting of first and second elongated jaw members positionable between open and closed positions, each jaw member including an interconnected end, a central region having inner sides and lateral edges and a free end, means connecting the jaw members together at their interconnected ends, a compression spring located between the jaw members' central regions biasing the jaw members' free ends toward each other toward the closed position, a fish line engaging portion defined upon each jaw member free end, the jaw member fish line engaging portions being in opposed relation and engaging each other at the jaw members' closed position, the improvement comprising, elongated, spring locating means defined on at least one of the jaw members' central region inner sides extending in a direction of a length of the associated jaw member associated with the compression spring, said spring locating means locating a position of the compression spring between the jaw members with respect to a distance between the spring and the jaw members' interconnected ends, the compression spring being adjustably positionable relative to said spring locating means to selectively adjust the distance between the spring and the jaw members' interconnected ends to vary the force biasing the jaw members' free ends toward each other.

5. The fish alarm system according to claim 1 wherein the power source includes a nine volt battery clip disposed in the enclosure for use with a nine volt battery.

6. The fish alarm system according to claim 1 wherein at least one of the alarm and second alarm includes a visual alarm.

7. The fish alarm system according to claim 1 wherein at least one of the alarm and second alarm includes an audio alarm.

8. The fish alarm system according to claim 1 further comprising a courtesy light and a courtesy light off-on switch attached with the enclosure, and a diode attached within the enclosure, wherein the courtesy light and the courtesy light off-on switch extend through the enclosure and the courtesy light is disposed with the enclosure such that the courtesy light may be used for illumination for inserting the fishing line in the tension clip, wherein the diode is electrically connected with the power source and the courtesy light such that the diode may be used to prevent the alarm from activation when illuminating the courtesy light, and wherein the courtesy light off-on switch may be electrically connected between the courtesy light and the power source to switch the courtesy light off and on.

9. The fish alarm system according to claim 8 wherein one of the alarm and second alarm comprises the courtesy light which is a visual alarm used for the dual purpose of alerting the user as well as illumination for inserting the fishing line in the tension clip.

10. The fish alarm system according to claim 1 further comprising an external spring assembly including an external spring, an adjustable tension thumb screw and an anchor bracket wherein the external spring is attached between the alarm toggle arm and the anchor bracket wherein the anchor bracket is attached with an outside of the enclosure such that the force required for moving the alarm toggle arm may be increased or decreased.

11. The fish alarm system according to claim 10 wherein the anchor bracket is disposed on the enclosure forward of the alarm toggle arm such that it decreases the fishing line tension required for moving the alarm toggle arm, creating a hair trigger effect wherein smaller fish may be successfully caught.

12. The fish alarm system according to claim 10 wherein the anchor bracket is disposed on the enclosure aft of the alarm toggle arm such that it increases the fishing line tension required for moving the alarm toggle arm whereby as the alarm toggle arm moves to the hook set position the hook setting process may begin as the fish alarm system alarm is activated.

13. The fish alarm system according to claim 1 further comprising a water proof connection for communication of a signal to at least one remote alarm from a terminal of the alarm toggle switch such that movement of the alarm toggle arm may be used to activate the signal and communicate the signal through the connection to the at least one remote alarm.

14. The fish alarm system according to claim 1 further comprising a water proof connection wherein a battery charger may be electrically connected with the water proof connection such that an external power source connected through the water proof connection may supply electrical power for charging the battery.

15. The fish alarm system according to claim 1 further comprising a water proof connection including terminals wherein an external power source may be connected through the terminals of the water proof connection as the power source when the external power source is desired.

16. The fish alarm system according to claim 1 wherein the enclosure may be attached to a structure that is not a fishing rod whereby the fishing rod is not encumbered by the fish alarm system and the fishing rod, a reel, and the fishing line may be used unencumbered to fight and land a fish.

17. The fish alarm system according to claim 16 wherein the enclosure may be attached to a structure that is not a fishing rod holder.

18. The fish alarm system according to claim 1:
wherein the tension clip is an adjustable tension clip wherein the adjustable tension clip comprises jaw members that are spring biased toward a holding position producing a variety of holding forces from a compression spring whereby the tension of the clip may be adjusted for the desired tension for releasing the fishing line such that the fishing line may be inserted in the spring biased jaw members wherein as the force on the fishing line increases, the tension of the tension clip allows the alarm toggle arm to toggle from the off position to the hook set position for activating the second alarm from the hook set, whereby the tension of the clip may be adjusted by adjusting the compression spring for the desired tension for releasing the fishing line;
wherein the enclosure is a watertight enclosure, wherein the watertight enclosure is sealed with the alarm toggle arm, and sealed with the alarm and second alarm whereby the watertight enclosure protects the electrical components and circuits within the watertight enclosure from moisture; wherein the alarm toggle arm is disposed approximately half way between forward and aft ends of the enclosure; wherein the alarm toggle arm is sealed through the enclosure; wherein the power source includes a nine volt battery clip attached inside the enclosure for use with a nine volt battery; and one of the alarm and second alarm includes a visual alarm that is sealed such that the visual alarm is sealed for preventing moisture in the enclosure wherein the visual alarm is a light, the other of the alarm and second alarm further includes an adjustable volume warble audio alarm that is sealed with the enclosure thereby protecting the enclosure from moisture; and
further comprising a courtesy light, a courtesy light off-on switch attached with the enclosure and a diode attached within the enclosure such that the light and the courtesy light off-on switch extend through the enclosure through a gasket for maintaining a watertight seal and the courtesy light is disposed with the enclosure such that the light may be used for inserting the fishing line in the tension clip, wherein the diode is electrically connected with the power source and the courtesy light such that the diode may be used to prevent the alarm from activation when illuminating the courtesy light and wherein the courtesy light off-on switch may be electrically connected between the courtesy light and the power source to switch the courtesy light off and on.

19. The fish alarm system according to claim 18 further comprising a relay attached with the three position alarm toggle switch whereby the relay may activate additional visual and audio alarms; and further comprising an external spring assembly including an external spring, an adjustable tension thumb screw and an anchor bracket, wherein the external spring is attached between the alarm toggle arm and the anchor bracket, wherein the anchor bracket is attached with an outside of the enclosure, such that the force required for moving the alarm toggle arm may be increased or decreased.

20. The fish alarm system according to claim 1 wherein the alarm includes an adjustable volume warble audio alarm and the second alarm includes a second tone audio alarm electrically connected with the three position alarm toggle switch such that one tone of the adjustable volume warble audio alarm may be used for the bite alarm and another tone of the second tone audio alarm may be used for the hook set alarm; and further comprising a water proof connection for transmission of a signal to at least one remote alarm wherein a terminal of the alarm toggle switch is electrically connected with the water proof connection such that the terminal may be used to activate the signal and communicate the signal through the water proof connection to the at least one remote alarm;

wherein the enclosure is a 2.4 inch by 2.5 inch by 4.7 inch watertight polycarbonate enclosure.

\* \* \* \* \*